United States Patent Office 3,016,252
Patented Jan. 9, 1962

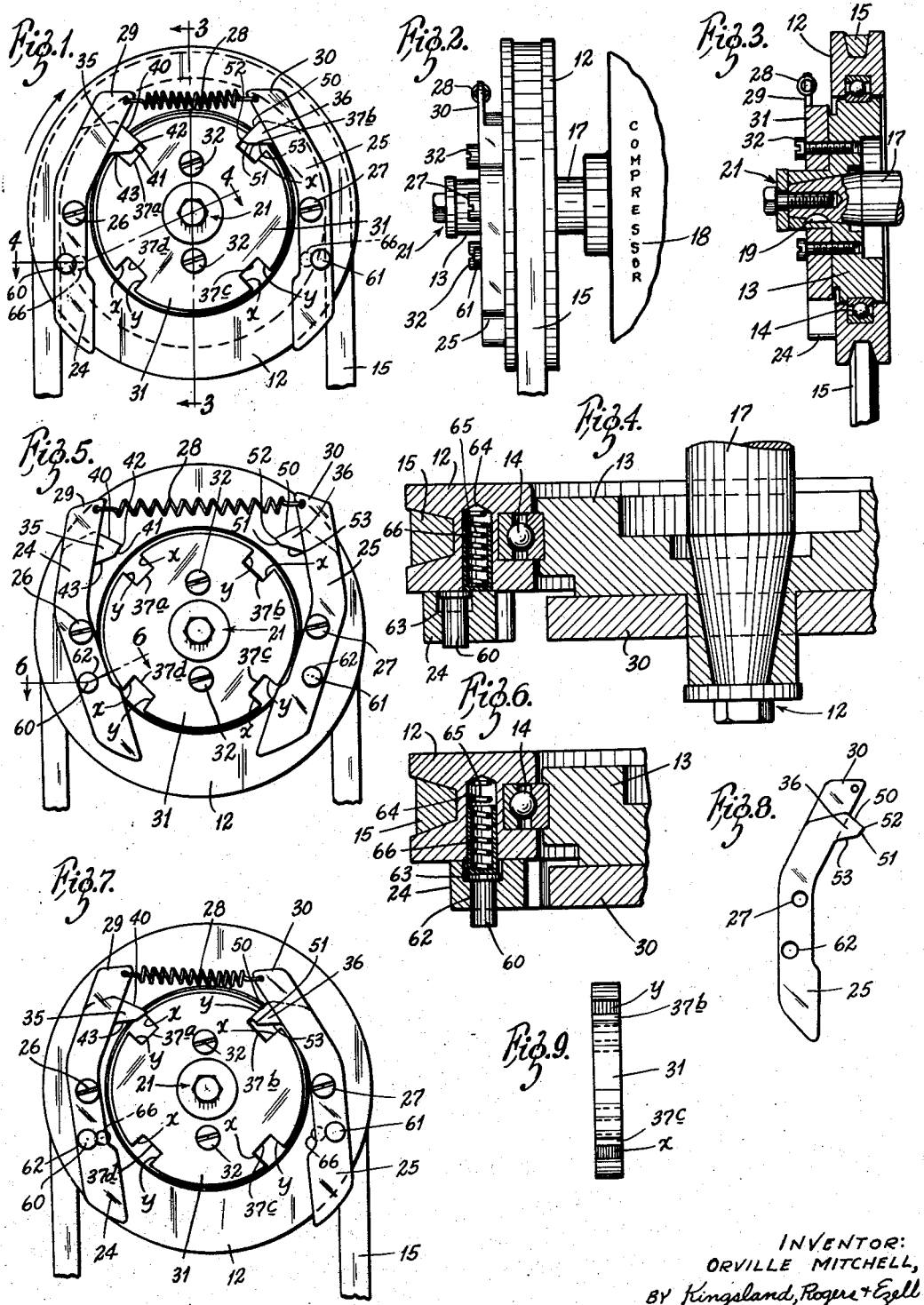

3,016,252
DOG CLUTCH
Orville Mitchell, Dallas, Tex., assignor to John E. Mitchell Company, Inc., Dallas, Tex., a corporation of Missouri
Filed Feb. 27, 1957, Ser. No. 642,891
11 Claims. (Cl. 287—52)

The present invention relates to a dog clutch. It has particular application to a clutch such as that used on automobile air conditioner compressors wherein the driven clutch member is operated by a belt such as the fan belt of the automobile and the concentric driven member drives the compressor shaft.

In the particular embodiment shown, the driving member rotates around the periphery of the driven member with an appropriate bearing between them. This specific relationship is not essential to the inventive features hereof. The driving member carries a pair of pivoted clutch dog arms that are normally resiliently urged to force their dog elements into engagement against oppositely facing abutment surfaces of the driven member, in a predetermined order. The dogs and the abutment surfaces are so shaped, and travel in such paths, that they engage with a wedging action that precludes lost motion of whichever member of the clutch is the driving member. The dogs' arms can be latched in their released positions, the latches being manually releasable so that the clutch may be engaged or disengaged at will.

As noted, a particular usage of the invention is on automobile air conditioner equipment because it is desirable to be able to disconnect the air conditioner compressor during cold weather, thereby to relieve its load from the engine, and to make a corresponding reduction in idling wear on the compressor. However, other uses will be apparent from an understanding of the construction.

One of the particular features of this clutch is that it automatically locks itself tightly whenever the two dogs are released into their operation position, regardless of the order in which the dog arms are released. It not only locks tightly but it locks itself against an irregular pulsating load, such as that of a compressor. It does this by providing for a particular engagement of the dogs with the abutment surfaces in notches of the driven member that assures a tight, wedged, locking engagement.

A further object of the invention is to provide a clutch of this type in which the clutch dogs engage in a predetermined order and in which, if they engage in the wrong order, the normal running of the driving member will cause them to be withdrawn and to be re-engaged in the proper order to produce the tight, wedging effect.

Another object of the invention is to provide, in a clutch of the foregoing kind, a construction such that the dogs may be manually released with no trouble, whenever it is desired to release them.

Other objects will appear from the description to follow.

In the drawings:

FIGURE 1 is a front elevation of the clutch and its driving belt showing the clutch dogs engaged in proper fashion to lock the clutch;

FIGURE 2 is a side elevation of the clutch shown in FIGURE 1, showing how it is attached to a compressor shaft, and with the driving belt shown fragmentally;

FIGURE 3 is a vertical section on the line 3—3 of FIGURE 1;

FIGURE 4 is a partial section taken on the line 4—4 of FIGURE 1 to show the dog arm latch released;

FIGURE 5 is a front elevation of the clutch with the dogs retracted;

FIGURE 6 is a partial section taken on the line 6—6 of FIGURE 5 to show the dog arm latch engaged;

FIGURE 7 is a view of the clutch showing what happens when the dogs are engaged in the wrong order;

FIGURE 8 is an elevation of one of the clutch dogs; and,

FIGURE 9 is an edge view of the notched driven disc of the clutch.

The clutch includes an outer driving member 12 and an inner driven member 13 upon which the outer member 12 rotates, with a suitable bearing 14 interposed between them. It is not necessary here to show the details of the connections between these parts, since it is readily understandable how they can be supported for coaxial, relative rotation.

The driving element is shown in the shape of a V-pulley so that it can receive a V-belt 15, by means of which it may be driven from some suitable source of power such as the crankshaft of an automobile engine. The inner, driven member 13 of the clutch assembly is mounted upon the tapered end of the shaft 17 of a compressor 18, there being an appropriate key 19 between them. The parts are secured together by a screw and washer 21, all as is readily apparent from the drawing.

The driving member is provided with two clutch dog arms 24 and 25 that are rockably pivoted at 26 and 27 respectively on what will be termed the outer face of the driving member. A fairly stiff coil spring 28 is connected between projections 29 and 30 on the ends of the dog arms 24 and 25. The spring 28 urges the ends of the dog arms toward each other and also toward the edge of a disc 31 that is held by two screws 32 to the outer surface of the inner clutch element 13. As will appear, this spring action urges the clutch dog arms into coupling positions.

The dog arms or levers 24 and 25 have clutch dogs 35 and 36 projecting therefrom as illustrated in the drawings, so that they can impinge upon the peripheral edge of the disc 31 or can engage two adjacent ones of the notches 37a, 37b, 37c, and 37d in the peripheral edge of the disc 31. Each of the notches has a forward "radial" end edge x and a rearward "radial" end edge y. Actually these edges x and y are parallel to a radius drawn through the middle of such notch.

The dog 35 on the dog arm 24 has a forward edge 40 merging in a bottom or inner edge 41 at a point or tip 42. The edge 41 then merges into an edge 43. The size of the dog 35 is sufficient that when the forward edge 40 is engaged against the corresponding edge x of any notch 37, the rear sloping edge 43 will rest upon the trailing corner of the edge y of the notch. In this position, which is the maximum distance that the dog 35 can enter any of the slots, the forward edge 40 is approximately normal to a radius drawn to the bottom of the notch 37 from the center of the pivot 26 for the dog arm. The purpose of this is to be sure that the dog arm may be pivoted in a direction to withdraw the dog from the slot without having the tip 42 bind against the edge x.

Also, the sloping edge 43 at the back of the dog should have an angle such that, if the driving element 12 is rotated backwardly relative to the driven element (which would be counterclockwise in the present illustration) the outer corner of the edge y of the notch 37 will cam against the edge 43 and force the dog out of the notch to disengage the clutch element.

The dog arm 25 has the dog 36 thereon, that is similar to the dog 35. The dog 36 includes a driving or force-transmitting abutment edge 50, a bottom edge 51, that slopes outwardly and backwardly from the abutment edge 50, a tip 52 at the junction of the two edges 50 and 51, and an upper or back edge 53 with a steep incline for camming action as will appear.

The contours of the edge y of the notch 37b and the abutment edge 50 of the dog 36, and the distance from the abutment edge 50 to the pivot center 27, are such that, when the first or main dog 35 is in its fully engaged position illustrated in FIGURE 1, and the second or wedging dog 36 is approaching its engaging position, a wedging action occurs in which the dog 36 attempts to force the entire driven member backward against the resistance of the main dog. This is accomplished by having the angle between a radius from the center of the pivot 27, to the surface y of the notch at the point of contact less than 90° with that surface y. By this arrangement, further inward movement of the dog 36 wedges against the surface. While the edge contours may vary from those shown, the wedging relationship, such as is obtained in these edges by that angular relationship, is of great importance to this invention. In simplest embodiment, the edge y will be flat and substantially parallel to the radius through the middle of the notch, and the dog abutment edge 50 will be flat and parallel to that edge when the arm 25 disposes the point 52 of the dog 36 at the entrance to the notch 37b. When the dog is fully entered into the notch, the edge 50 will have a slight slope toward the axis of the clutch.

The amount of displacement of the clutch member 13 produced by the dog 36 acting against the edge y is sufficient, so that if the dog 36 acts against the edge y when the main dog 35 is not in the notch 37a, the forward edge x of the notch 37a will be rearward of tip 42 of dog 35, as illustrated in FIGURE 7. This will prevent any engagement of the dog 35 in the notch 37a until the driving member 12 is forced forwardly 90° to bring another pair of notches adjacent the two dogs.

The dog 36 should be narrower across the base than the notches 37. This will insure full movement of the dog 36 into the slot, so that adequate wedging action can be had, even after wear on the parts, and without very small tolerances in machining of the parts in manufacture. The edge 53 of the dog 36 slopes outwardly and forwardly, with such angle that clockwise rotation of the outer clutch member 12, in the positions of FIGURE 7, will cam the dog out of the notch.

The two dog arms may be held in retracted position. To this end there are two push buttons 60 and 61, supported in the dogs. Their construction is identical and only one need be described. As shown in FIGURES 4 and 6 the push button 60 is flanged on its inner end and is slidably inserted in a hole 62 through the dog arm 24, which hole is enlarged to provide a shoulder 63 against which the flange of the push button 60 may engage to limit outward movement of the push button.

There is a bore 64 in the driving member 12 which receives a coil spring 65 that acts upon a slidable cap 66.

When the cap 66 is aligned with the hole 62 and the push button 60, the spring 65 will push the cap member 66 into the hole 62 against the push button 60, and force the push button outwardly. The cap thereby locks the dog arm in the position illustrated in FIGURE 5. Finger pressure upon each of the push buttons 60 and 61 forces the caps 66 inwardly against their springs 65 until the flanges of 60 and 61 strike the surface of the member 12, whereupon spring 28 will draw the two dog arms toward each other.

Operation

A particular use of the clutch of this invention is to connect and disconnect the compressor of an automobile air conditioning system from the automobile engine, so that the compressor is not driven at times when air conditioning is not needed.

A compressor provides a pulsating load on the clutch, resulting from the fact that when the compressor crankshaft goes over dead center, the compressed gas in the cylinder tends to surge the piston forwardly, causing the driven member to become the driving member of the clutch. As a result, any lost motion in the coupling, whether in forward or reverse direction, will cause objectionable noise, wear, and other problems.

The present clutch is shown fully released in FIGURE 5. The outer clutch element 12 is designed to rotate clockwise and to drive the inner element 13 upon which the disc 30 is mounted. In order to couple the clutch elements, the user merely depresses the buttons 60 and 61 as far as they can go, whereupon the push button latch elements 66 are retracted and the spring 28 can draw the upper ends of the two dog arms 24 and 25 toward the periphery of the disc 30.

The lower part of each of the dog arms is sufficiently wide that it continues to cover the ends of its cap 66 when the dog arm is in its inward coupling position.

With the outer clutch member 12 rotating clockwise, the dog arms released, and the dogs 35 and 36 riding on the periphery of the disc 30, the dog 35 will enter the notch 37a before the tip 52 on the dog 36 has reached the edge y of the notch 37b. The dog 35 will almost reach the position of FIGURE 1 before the dog 36 is permitted to enter the notch 37b. However, just at the time when the surface 40 on the dog 35 is ready to make contact against the edge x of the notch 37a, the corner 52 of the dog 36 will drop into the notch 37b and its edge 50 will wedge against the edge y of the notch 37b, as heretofore explained, in such wise as to produce a tight forced engagement between both dogs and their notches.

The upper edge 40 of the dog 35, acting against the notch edge x, constitutes the abutment edge for driving the clutch in the forward direction, while the edge 50 of the dog 36 acting against the notch edge y, constitutes the abutment edge for transmitting any driving thrusts when the driven element becomes the driving element.

The foregoing wedging action is the thing that insures that there will be a solid drive with no lost motion, even with a pulsating load.

It can be noted from the foregoing that the wedging action is obtained only when the dog 35 engages its notch first. But the clutch is designed so that, even if the dogs 35 and 36 do not enter the notches 37a and 37b in that order, they, nevertheless, will readjust themselves to the proper order automatically.

If the button 61 is operated to release the arm 25 while the clutch members happen to be positioned so that the dog 36 enters the notch 37b, as illustrated in FIGURE 7, then the edge 50 of the dog 36 quickly abuts the upper edge of the notch 37b. When this occurs, the dog 36 is all the way into the notch 37b, which displaces the clutch members so that the dog 35 cannot enter the notch 37a at all. FIGURE 7 illustrates this relationship. However, a continued clockwise driving movement of the clutch member 12 will cause the arm 25 to be drawn clockwise, and the dog's slanting surface 53 to engage the lower corner of the notch 37b, and the surface 53 to cam the dog out of the notch. Thereupon continued clockwise rotation of the outer clutch member 12 will move the parts around in normal fashion, until the main dog 35 enters the notch 37b prior to the time the corner 52 of the dog 36 can reach the subsequent notch 37c. The coupling then proceeds normally to obtain the wedging effect.

When it is desired to uncouple the clutch, as when air-conditioning of the vehicle is no longer desired, the operator merely engages the lower ends of the two arms 24 and 25, which are long enough to provide handles with adequate leverage to make it convenient to spread the upper ends of the two levers. The lower ends of the arms 24 and 25 are squeezed together until the caps 66 under the push buttons 60 and 61 latch in place within the push button holes 62, after which the arms cannot be re-swiveled to their clutch engaging positions without depression of the two push buttons.

The withdrawal of the arms is facilitated by the geometry previously described. In order to assure good wedging action, the movement of the dogs toward the axis, is always accompanied by wedging drives against the notches. This same geometry means that, as the dogs move out of the notches, their respective abutment edges simultaneously back away from their corresponding notch edges.

It is, of course, understood that variations of the clutch may be made, without departing from use of the present invention.

What is claimed is:

1. A clutch having first and second rotary clutch members, each rotatable relative to the other, one of which is a driving member and the other of which is a driven member; first and second clutch dogs, means supporting the dogs in spaced relation on the first member for movement toward and from the second member, in predetermined, fixed paths; means defining recesses in the second member into which the dogs may engage; means associated with the dogs for resiliently urging the dogs into the recesses; releasable means engageable by the dogs for holding the dogs out of the recesses; means including interoperating slidably engageable portions of the dogs and the recess walls to cause the dogs to wedge into engagement with oppositely facing walls of the recesses when the first dog enters a recess first, and the second dog thereafter enters a recess, and means including differently sized base portions of the respective dogs to insure that the dogs will ultimately engage the recesses in that order upon release of the releasable means, regardless of which dog initially enters a recess first.

2. A clutch having first and second rotary members, each rotatable relative to the other, one of which is a driving member and the other a driven member; the first member having a pair of clutch dogs connected to it in such a way as to be movable in and out toward and from the axis of the clutch and the second member having a pair of generally radial abutment surfaces against which the dogs may respectively engage when so moved, one surface being disposed in the forward direction of rotation from its dog and the other surface being disposed in the backward direction of rotation from its dog; so that when the dogs are engaged with their respective surface they provide driving engagement between the clutch members in both directions of rotation, one of the dogs being a main dog and the other being a wedging dog having means to cause angular displacement between the rotary members, so that it can force the other abutment surface tightly against the main dog.

3. The combination of claim 2, wherein the abutment surface engaged by the wedging dog is of sufficient radial extent that when its dog is in fully moved engaged position, it will have displaced the other abutment surface too far to permit the main dog to move into engagement therewith.

4. The clutch of claim 3, wherein the wedging dog has a follower surface adjoining its part engaging the abutment surface, said follower surface being formed so as to slope in the direction of forward rotation from the abutment surface and away from the member having the abutment surfaces, whereby if the sloping surface is forced against the abutment surface for the other dog, it will be cammed outwardly therefrom.

5. The clutch of claim 3, with resilient means urging the dogs toward clutching engagement, the second clutch member having a circular portion notched in its edge to provide the abutment surfaces, and the main dog having a lower surface that extends in the direction of backward rotation and away from the second clutch member, so that when it is urged toward clutching engagement during rotation of the driving member, it will move into the notch and then into engagement with its abutment surface; and the wedging dog can engage in its recess only after the main dog has at least substantially reached its abutment surface.

6. The clutch of claim 2, wherein there are two arms, one supporting each dog, both arms being pivoted onto the first clutch member, resilient means urging the arms toward clutching position, and releasable latch means for holding the arms in clutch-disengaging position.

7. The clutch of claim 6, wherein the arms are pivoted about axes parallel to the clutch axis, and the abutment surfaces are disposed substantially perpendicular to radii from the pivot axes, and the tips of the dogs engaging the abutment surfaces, when the dogs are both engaged, are not moved further toward the clutch axis than the radii from the pivot axes that are perpendicular to the abutment surfaces.

8. A clutch having first and second rotary clutch members, each rotatable relative to the other, first and second dog members movably mounted on said first clutch member, means defining two oppositely angularly faced surfaces on said second clutch member, resilient means operative upon the dog members for urging said dog members simultaneously toward said second clutch member for respective abutting engagement with the oppositely angularly faced surfaces, and means including additional interengageable elements on the first dog and on the second clutch member for insuring ultimate engagement of the second dog with its one of said surfaces subsequently to engagement of said first dog with another of said surfaces.

9. The combination of claim 8 wherein the oppositely angularly faced surfaces comprise portions of identical notches disposed equal radial distances from the axis of rotation of the second clutch member, and wherein the dog members are differently formed so as to be restricted to different limits of engagement in said notches.

10. A clutch having first and second clutch members, the members being movable relative to one another, first and second dog members movably mounted on the first clutch member, means defining two oppositely faced surfaces on the second clutch member, resilient means operative upon the dog members for urging the dog members simultaneously toward the second clutch member for respective abutting engagement with the oppositely faced surfaces, and means including additional interengageable elements on the first dog and on the second clutch member for insuring ultimate engagement of the second dog with its one of the surfaces subsequently to engagement of the first dog with another of the surfaces.

11. A clutch having first and second rotary clutch members, said second clutch member being rotatable relative to the first one under one condition of the clutch, means defining two oppositely angularly faced surfaces on said first clutch member, first and second dog members movably mounted on said second clutch member, said dog members being mounted for movement in respective predetermined paths toward respective ones of said surfaces, the path of movement of the first dog member being such as to enable the first dog member to move into a position for abutment with its one of said surfaces, when the second clutch member is rotated relative to the first, the path of movement of the second dog member being such as to provide slidable biasing engagement between the second dog member and its one of said surfaces so as to urge the first clutch member toward rotation in a direction to move the other of said surfaces toward and beyond a position for abutment with the first dog member, and resilient means operable upon the dog members for simultaneously biasing the first dog member toward its aforesaid position for abutment and the second dog member toward slidable biasing engagement with its one of said surfaces, the first clutch member having means engageable with the first dog member for preventing the latter from moving into abutment with its aforesaid surface while the second dog member is in biasing engagement with its surface.

References Cited in the file of this patent

UNITED STATES PATENTS 697,166    Phelps et al. _____ Apr. 8, 1902

(Other references on following page)

UNITED STATES PATENTS

| | | | |
|---|---|---|---|
| 938,164 | Musser | Oct. 26, | 1909 |
| 942,244 | Boda | Dec. 7, | 1909 |
| 1,163,815 | Evensen | Dec. 14, | 1915 |
| 1,193,716 | Purssell | Aug. 8, | 1916 |
| 2,056,666 | Geldhof | Oct. 6, | 1936 |
| 2,163,596 | Fischer | June 27, | 1939 |
| 2,394,429 | Crosman | Feb. 5, | 1946 |
| 2,414,112 | Malone et al. | Jan. 14, | 1947 |
| 2,472,953 | Meyer | June 14, | 1949 |
| 2,633,957 | Gardinor et al. | Apr. 7, | 1953 |